UNITED STATES PATENT OFFICE.

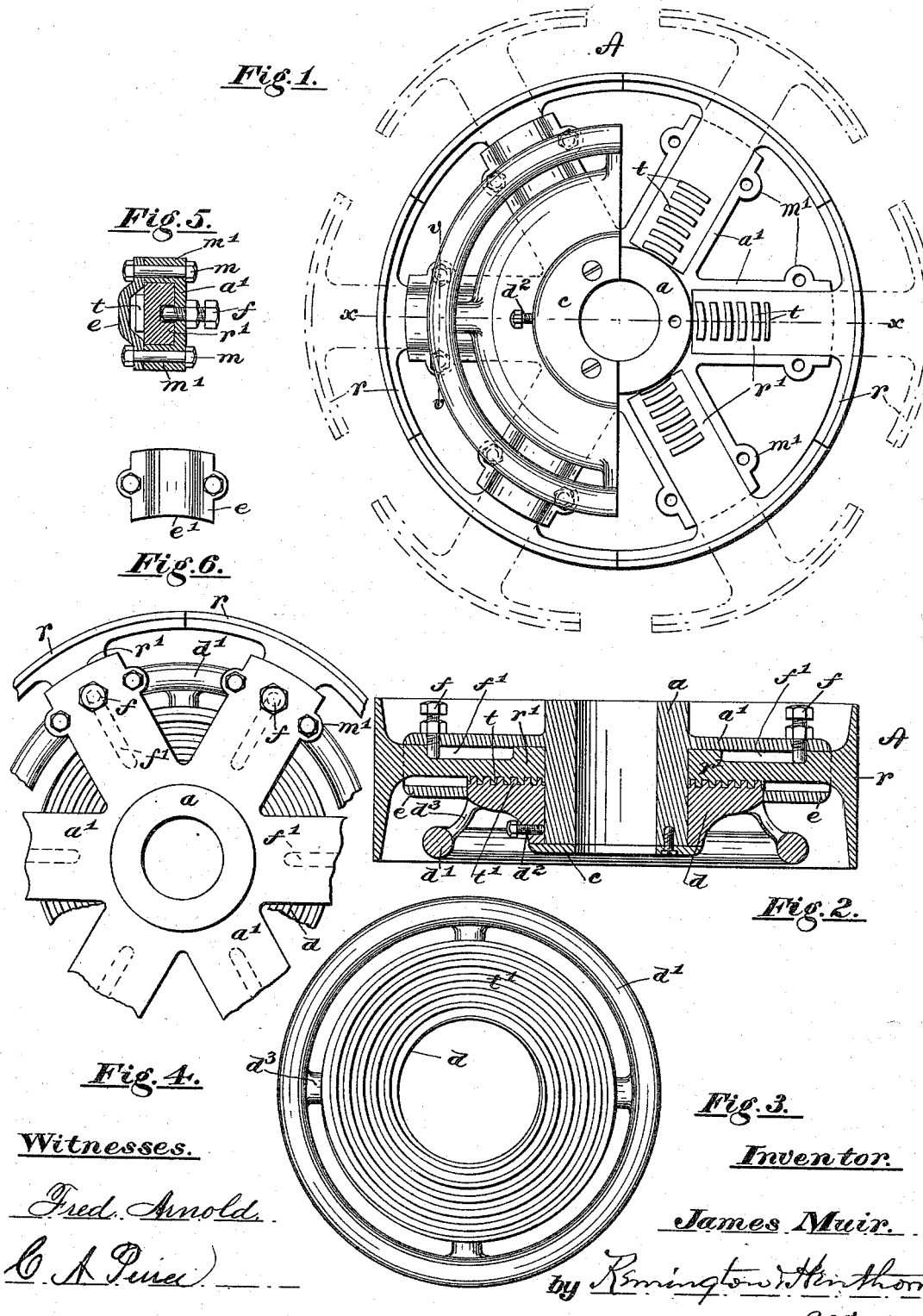

JAMES MUIR, OF PROVIDENCE, RHODE ISLAND, ASSIGNOR TO THE PHENIX IRON FOUNDRY, OF SAME PLACE.

EXPANSION-PULLEY.

SPECIFICATION forming part of Letters Patent No. 541,870, dated July 2, 1895.

Application filed February 12, 1894. Serial No. 499,916. (No model.)

*To all whom it may concern:*

Be it known that I, JAMES MUIR, a subject of the Queen of Great Britain, residing at Providence, in the county of Providence and State of Rhode Island, have invented certain new and useful Improvements in Expansion-Pulleys; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to improvements in expansion pulleys, that is, pulleys in which the rim portions are composed of a series of sectors adapted to be actuated in a radial direction simultaneously; and it consists essentially in the combination, with the hub or spider portion and screw-threaded arm-carrying sectors movably mounted therein, of a spirally grooved face-plate loosely mounted on said hub and in engagement with the sector-arms, means for securing the face-plate in position upon the hub, a collar secured to the end of the hub and in frictional contact with the outer end of the face-plate, stop-pins passing through the spider-arms and into slotted openings formed in the back of the sector-arms, and removably secured caps for covering and protecting the portions of the spider and arms extending beyond the rim of the face-plate, all as will be more fully hereinafter set forth and claimed.

In expansion pulleys as hitherto devised, in which the arms and rim-sectors are adapted to be moved in a radial direction by means of a spirally grooved or screw-threaded disk, it has been usual to employ gearing or other equivalent devices for rotating the disk, although in some cases the disk, &c., have been so constructed that the rim-sectors may be actuated without the intervention of gearing. An objection to such former devices is that the disk or operating wheel is as a rule located quite a distance from the pulley-rim. When thus constructed the pulley occupies a much greater space on the shaft than an ordinary pulley having the same width of rim or face. Another objection is that each individual arm is not readily accessible, in case of inspection or repair. Moreover, it sometimes happens that the pulley is expanded to such an extent that the teeth or threads upon the arms of the segments do not have sufficient holding capacity, the result being that the segments are liable to be thrown out by centrifugal force when the pulley is running at comparatively high speeds.

By means of my improvement the space required upon the shaft for the pulley need not exceed that required for an ordinary pulley having medium width; it is more cheaply made and at the same time more accurately operated and adjusted, and each arm may be readily exposed by simply removing the corresponding cover or cap, and finally by the employment of suitable stop-pins the pulley cannot be expanded beyond a fixed or safe limit.

In the accompanying sheet of drawings, Figure 1 is a front view of an expansion pulley provided with my improvement, a portion of the operating disk or face-plate being omitted. Fig. 2 is a horizontal sectional view, taken on line $xx$ of Fig. 1. Fig. 3 is a rear elevation of the disk itself. Fig. 4 is an elevation of the pulley, viewed from the rear. Fig. 5 is a cross-sectional view of one of the arms, taken on line $vv$, Fig. 1, and Fig. 6 is a front view of one of the arm-caps or covers, detached.

My improved pulley complete is indicated by A. As drawn, it is provided with a hub portion $a$ having a spider or spoke portion $a'$ integral therewith and extending radially therefrom, in which are mounted the arms $r'$ of the six rim-sectors $r$. The hub $a$ is bored out to fit the shaft, as common to any pulley; that is to say, it may be keyed to the shaft or arranged to revolve on it as desired. The spokes of the spider portion are machined to form a grooved seat for the several arms $r'$; the outer ends of the spokes being provided with side ears $m'$ which are drilled to receive bolts $m$. To the front end of the hub is removably secured an annular collar $c$ whose outer edge portion extends beyond the barrel of the hub for the purpose of maintaining the expansion face-plate or disk $d$ in position. The several rim-sectors $r$ are turned off true to receive a belt; each sector being provided with an arm $r'$ fitted to move radially in the seat formed in the corresponding spider-spoke $a'$. The front side of each arm is furnished with a series of raised ribs; the latter being arranged to form parts of a spiral or screw-thread $t$, as clearly shown. The faces of the arms are practically flush with the faces of the spokes, while the ribs $t$ extend beyond said faces.

The front portion of the hub $a$ is turned off true to form a support for the disk $d$. This disk, or expanding face-plate, just fills the distance between the adjacent faces of the collar $c$ and the spokes and is bored out to fit the said turned portion of the hub. When mounted thereon it will be apparent that while the disk is prevented from endwise movement, yet it is adapted to be freely revolved in either direction upon the hub; a set-screw $d^2$ being employed to secure the disk in position after adjustment. In the face of the disk is cut a spiral groove $t'$ the same forming the counterpart of the ribs $t$ of the sector-arms. The disk is further provided with a circular rim $d'$, and is connected therewith through the medium of short arms $d^3$, as clearly shown. It will be seen that the disk and its rim occupy a comparatively small space longitudinally of the shaft, although ample room is provided for manipulating them. Between the outer edge or periphery of the disk, which is turned off true, and the root of the sector-arms are located cap-plates $e$. These caps serve to cover and protect the adjacent front portion of the arms and are secured in place by bolts $m$ which pass through the caps and ears $m'$ located at the sides of the arms. The lower or inner ends $e'$ of the caps are made concave to fit the curvature of the disk the opposite or outer ends extending to and terminating with the corresponding ends of the spokes $a'$.

At or near the outer end of each of the spokes $a'$ is mounted a bolt or stop-pin $f$, its inner end extending through the spoke and into an elongated radial opening $f'$ formed in the rear face of the corresponding segment-arm $r'$, as clearly shown in Figs. 2 and 4. These slotted openings, $f'$, practically control and limit the radial movement of the segments, the relation of the inner end of the openings with respect to the stop-pins being such that the segments cannot be expanded too far, since the pins will arrest the segment's movement before all the teeth or threads $t$ become disengaged from the spiral groove $t'$ of the operating disk $d$. The arrangement further serves as a safety device in that the pin $f$ will prevent the segment from flying outwardly in case the holding thread $t$ becomes accidentally broken. Another advantage of the pin is that it can be so set or adjusted as to take up the wear and prevent rattling of the segment-arm.

I am well aware that expansion pulleys have been produced prior to my invention, and that the several segments have been operated simultaneously through the medium of screw-threads. Therefore I do not claim such broadly, but What I do claim is—

As an improved article of manufacture, the expansion pulley A, hereinbefore described, the same consisting of the hub member $a$ having a series of radiating spokes $a'$ provided each with a correspondingly arranged seat, a series of independent rim-sectors $r$ having arms $r'$ slidably mounted in said spoke seats and having the front faces of said arms provided with sections of spiral threads $t$, a face-plate $d$ mounted on and capable of being adjustably secured to said hub and having a spiral thread formed in its face in engagement with those of the sector-arms, caps $e$ secured to the front outer end portions of the said spokes $a'$ and exterior to the face plate, and stop-pins or bolts $f$ adjustably secured to the spokes, each pin having an end extending therethrough and in engagement with a slotted opening $f'$ formed in the back of the corresponding sector-arm, substantially as shown and described.

In testimony whereof I have affixed my signature in presence of two witnesses.

JAMES MUIR.

Witnesses:
GEO. H. REMINGTON,
IDA M. WARREN.